United States Patent [19]
King

[11] 3,759,445
[45] Sept. 18, 1973

[54] FLEXIBLE FITTING FOR LAWN SPRINKLER SYSTEMS

[76] Inventor: Robert W. King, 9245 Noble Ave., Sepulveda, Calif. 91343

[22] Filed: Jan. 2, 1973

[21] Appl. No.: 320,288

Related U.S. Application Data

[63] Continuation of Ser. No. 104,019, Jan. 5, 1971, abandoned.

[52] U.S. Cl................ 239/201, 239/207, 239/229, 239/588, 285/5, 285/235, 285/236, 285/239
[51] Int. Cl............................................. A01g 25/00
[58] Field of Search.................... 285/236, 235, 252, 285/174, 49, 239, 5, 6; 239/229, 201, 207, 588; 52/108; 94/1.5

[56] References Cited
UNITED STATES PATENTS

| | | | |
|---|---|---|---|
| 3,633,826 | 1/1972 | Baker | 239/229 |
| 2,930,531 | 3/1960 | Kennedy | 239/229 |
| 2,752,195 | 6/1956 | Whitehead | 239/229 X |
| 1,726,817 | 9/1929 | Franklin | 94/1.5 X |
| 3,478,715 | 11/1969 | Asbury | 94/1.5 X |
| 3,279,133 | 10/1966 | Kovte | 94/1.5 X |
| 2,165,704 | 7/1939 | Hood | 52/113 X |
| 1,939,968 | 12/1933 | Frei | 52/113 X |
| 2,786,486 | 3/1957 | Perkins | 285/174 X |
| 2,805,088 | 9/1957 | Cline et al. | 285/239 |

FOREIGN PATENTS OR APPLICATIONS

| | | | |
|---|---|---|---|
| 1,519,744 | 2/1968 | France | 285/235 |

Primary Examiner—Thomas F. Callaghan
Attorney—Robert C. Comstock

[57] ABSTRACT

A flexible fitting for lawn sprinklers. The fitting includes an elongated flexible tube. A pair of end members are secured to opposite ends of the tube. Each of the end members has external screw threading and an integral hexagonal nut for threadably connecting the fitting. One of the end members is connected to the pipeline and the other is connected to the sprinkler or sprinkler riser. The fitting provides a flexible connection between the sprinkler and the pipeline which is capable of yielding to prevent damage and injury in the event the sprinkler or sprinkler riser is accidentally struck.

7 Claims, 6 Drawing Figures

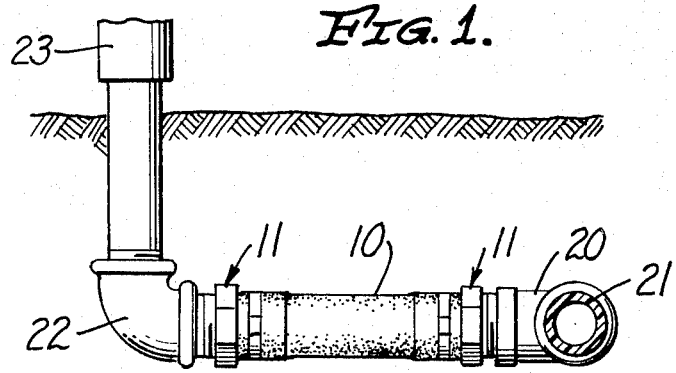
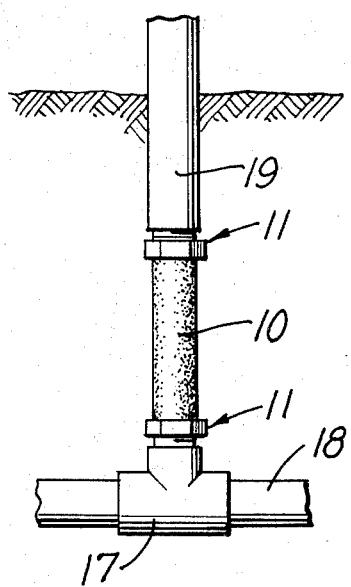
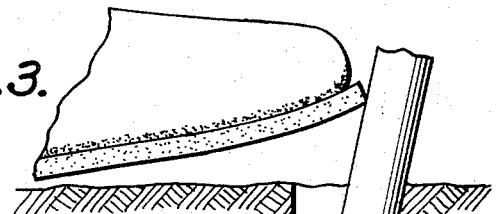
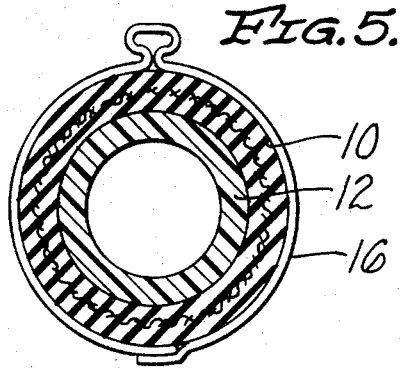
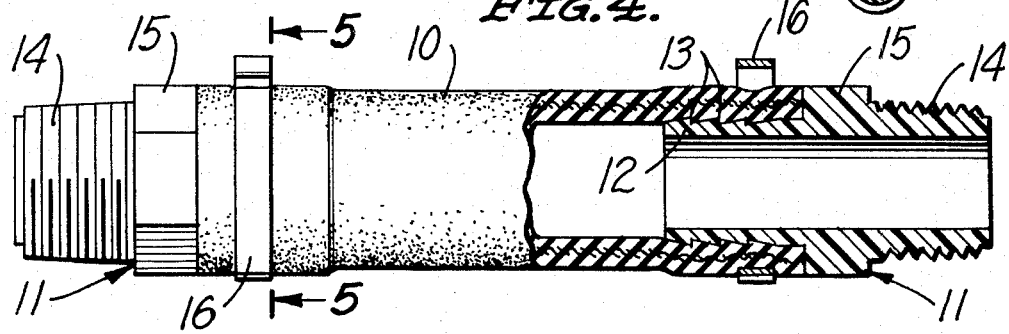
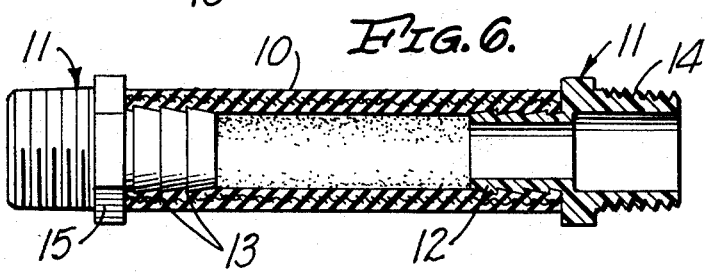
INVENTOR
ROBERT W. KING
BY
ROBERT C. COMSTOCK
ATTORNEY

3,759,445

FLEXIBLE FITTING FOR LAWN SPRINKLER SYSTEMS

This application is a continuation of application Ser. No. 104,019 filed Jan. 5, 1971, and now abandoned.

BACKGROUND OF THE INVENTION

1. Field of the Invention

The invention relates to a flexible fitting for use in automatic lawn sprinkler systems and the like.

2. Description of the Prior Art

At the present time, the risers of automatic lawn sprinklers of various sizes and types are connected to a metal or plastic pipeline either directly or through a swing joint assembly. In either case, there is a likelihood of breakage or damage to the riser or pipeline when the sprinkler is struck by a person or by a vehicle, lawn mower or other heavy equipment. In the case of plastic pipe, almost any impact such as that of a pedestrian can cause breakage of the pipe.

In school landscape installations, there is a danger of harm to both the students and the sprinkler system. In the case of athletic fields and golf courses, the players are likely to strike the sprinklers and cause injuries to themselves and/or damage to the sprinkler, riser or pipeline, due to the substantial inflexibility of the sprinkler and its support means.

Swing joints of the type which are now in use are cumbersome, costly and largely ineffective in preventing injury or damage to personnel, vehicles and the sprinkler system because they are not sufficiently flexible. Where no swing joint is provided, there is no flexibility whatsoever and there is nothing to prevent injury and damage from occurring when a sprinkler is struck.

SUMMARY OF THE INVENTION

The present invention provides a flexible fitting for lawn sprinkler systems and the like which prevents damage and injury to the person or vehicle striking the sprinkler and which also prevents damage to the sprinkler systems itself in the case of collision or impact of any kind.

The flexible fitting is adapted to be mounted in a vertical position beneath the sprinkler and/or sprinkler riser, connecting the sprinkler or riser to the pipeline. The flexible fitting can also be used in a horizontal position, with one end of the fitting being connected to the pipeline and the other end connected to an elbow which is in turn connected to the sprinkler and/or sprinkler riser.

The flexible fitting is customarily disposed beneath the ground level to provide a non-rusting permanently flexible connection which permits the sprinkler and/or riser to undergo almost any type or amount of abuse or physical impact without damage or injury to the person or machine involved or to the sprinkler systems itself.

Whenever the sprinkler is struck, the blow is absorbed by the flexible fitting, so that the sprinkler is undamaged and the pipeline is left undisturbed. Because the riser is able to yield in response to the impact, personnel injury and damage to machinery involved is either completely eliminated or substantially reduced.

It is accordingly among the objects of the invention to provide a flexible fitting having all of the advantages and benefits set forth above and described hereafter in this specification.

It is particularly an object of the invention to provide a fitting which is more economical to manufacture and install than the s wing joint assembly of the type now in use and which provides greater protection for both persons and property.

Another object of the invention is to provide a fitting of the type described which can be installed beneath the ground level and which will last as long as the sprinkler system itself.

A further object is to provide a flexible fitting of the type described which is simple and eonomical to manufacture and simple and economical to use.

The invention also comprises such other objects, advantages and capabilities as will later more fully appear and which are inherently possessed by the invention.

While I have shown in the accompanying drawings preferred embodiments of the invention it should be understood that the same are susceptible of modification and change without departing from the spirit of the invention.

DESCRIPTION OF THE DRAWINGS.

FIG. 1 is a side elevational view of my fitting in use in a horizontal position;

FIG. 2 is a side elevational view of the fitting in use in a vertical position;

FIG. 3 is an end elevational view of the fitting in use in a vertical position, showing the manner in which the fitting flexes upon impact with the sprinkler riser;

FIG. 4 is an enlarged side elevational view of the fitting, partially broken away and shown in section;

FIG. 5 is a transverse sectional view taken on line 5—5 of FIG. 4;

FIG. 6 is a side elevational view of an alternative embodiment of the invention in which the tube grips the end members without the use of a clamp, with the right side of the drawing broken away and shown in section and the left side of the tube broken away to shown the fitting in elevation.

DESCRIPTION OF THE PREFERRED EMBODIMENT

A preferred embodiment which has been selected to illustrate my invention comprises an elongated central tube 10, which is preferably formed of synthetic rubber hose. Synthetic rubber is believed to be preferable because it will not rot or mildew when left in the ground for an extended period of time. However, any other suitable flexible material may also be used.

The inside diameter of the tube 10 preferably corresponds to that of conventional sprinkler pipeline tubing. The tube 10 may accordingly be provided in various sizes, such as one-half, three-quarter, one inch etc.

Attached to the opposite ends of the tube 10 are a pair of end members 11, which may conveniently be formed of substantially rigid plastic material such as molded polyvinyl chloride. Metal or any other suitable substantially rigid material may also be used to form the end members 11.

Each of the end members 11 has at one end thereof an integral elongated shank 12, the outer diameter of which is substantially equal to the inner diameter of the tube 10. The shank 12 is provided with a plurality of ratchet-like steps 13. Each of the steps 13 comprises a slightly inwardly slanted surface which terminates in a radial wall.

The opposite end of each of the end members 11 is provided with external screw threading 14, which is adapted to be connected to a pipeline, sprinkler, riser or plumbing connection.

The midportion of the end member 11 comprises an enlarged hexagonal nut 15. The nut 15 and all of the other parts named may conveniently be formed as integral portions of the end member 11 when the same is formed of molded plastic material.

In assembling the fitting, the shanks 12 of the end members 11 are inserted into the opposite ends of the tube 10 until the ends of the tube 10 are brought against the inner edges of the nut 15.

A circular clamp 16 is then mounted around the outside of each end of the tube 10, overlying the steps 13 of the shank 12. The clamp is then secured by reducing its diameter to bring it into tight engagement with the outer periphery of the hose 10. Movement of the shanks 12 of the end members 11 out from the ends of the hose 10 is prevented by this tight frictional engagement and also by the radial walls of the steps 13, which resist such outward movement. While any suitable hose clamp may be used, zinc plated clamps of the type shown in the drawings are believed to be most economical and expedient in assembly.

Instead of using the clamps 16, it is possible to use other holding means including a tube 10 which is formed of braided material and which automatically reduces its inner diameter and tightens its grip on the shanks 12 of the end members 11 as elongating pressure is applied to it. This embodiment of the invention is shown in FIG. 6 of the drawings.

In use, the fitting may be installed in a vertical position, as shown in FIG. 2 of the drawings. In such installation, the lower end member 11 is attached to a tee 17, which is inserted in the pipeline 18. The upper end of the fitting is connected to a sprinkler riser 19, as shown, or it may be connected directly to the sprinkler without the use of a riser 19.

The fitting may also be installed in a horizontal position, as shown in FIG. 1 of the drawings. In such installation, one end member 11 is attached to a tee 20 which is inserted in the pipeline 21. The other end member 11 is attached to an elbow 22, which is in turn connected to a sprinkler 23, either with or without a riser between.

It will be noted that in both installations the fitting provides a flexible connection between the sprinkler (or sprinkler riser) and the pipeline. This flexible connection is capable of yielding in order to absorb any blows or impacts which may be directed against the sprinkler and/or riser by personnel, vehicles, equipment, etc. The fitting is customarily mounted beneath the ground level, but is capable of lasting equally as long as the sprinkler system. As shown in FIG. 3 of the drawings, when the sprinkler or riser 19 is struck, the tube 10 flexes to accommodate the movement of the riser 19, but its flexing movement is necessarily inhibited and limited by the resistance of the earth surrounding the fitting. The earth surrounding the riser 19 and tube 10 will accordingly absorb a substantial portion of the impact which is transmitted to it by the flexing of the tube 10.

It will be noted that the flexible fitting provided by this invention is more economical to manufacture and more economical to install than the cumbersome swing joint assembly of the type now in use. It also provides a much greater amount of flexibility to provide greater protection against damage of any kind resulting from accidental impact.

I claim:

1. In a lawn sprinkler system in which a plurality of spaced sprinklers are individually connected to a water supply line, the improvement which comprises a fitting connecting each of said sprinklers to said supply line, each of said fittings comprising an elongated flexible tube, a pair of end members secured to opposite ends of said tube, each of said end members having screw threading, one of said end members being connected to said supply line and the other of said end members being connected to one of said sprinklers, so that said fittings provide a flexible connection between each of said sprinklers and said supply line which is capable of yielding in the event a sprinkler is accidentally struck by a person or machine to prevent damage or injury to the person and machine and to said sprinkler and supply line, each of said fittings being disposed in its entirety within the earth so that the yielding movement of said fitting is inhibited and limited by the resistance of the earth surrounding said fitting whereby a substantial portion of the impact is transmitted to the surrounding earth by the flexing of said fitting.

2. The structure described in claim 1, each of said end members having external screw threading, and an integrally formed hexagon nut disposed inwardly from said screw threading for facilitating the threadable connection and disconnection of said fitting.

3. The structure described in claim 2, each of said end members having an integral shank extending a substantial distance into one end of said tube.

4. The structure described in claim 3, each of said shanks having a plurality of adjacent ratchet-like steps formed thereon, each of said steps including an inwardly slanted portion terminating in a substantially radial wall.

5. The structure described in claim 4, and a hose clamp mounted around each end of said tube in overlying relationship to said shank and steps, said clamps forming a tight frictional engagement between said tube and shanks to prevent the removal of said end members from the ends of said tube.

6. The structure described in claim 4, the ends of said tube being in tight frictional engagement with said shanks and said tube being formed of braided material which is adapted to reduce its inner diameter upon longitudinal elongation and tighten its grip upon said shanks to prevent the removal of said end members from the ends of said tube.

7. The structure described in claim 5, said tube, end members and clamps all being formed of waterproof material capable of remaining underground for an extended period of time without deterioration.

* * * * *